United States Patent
Zhang et al.

(10) Patent No.: US 12,153,878 B2
(45) Date of Patent: Nov. 26, 2024

(54) INTENT DETECTION VIA MULTI-HOP UNIFIED SYNTACTIC GRAPH

(71) Applicant: NEC Laboratories America, Inc., Princeton, NJ (US)

(72) Inventors: Xuchao Zhang, Elkridge, MD (US); Yanchi Liu, Monmouth Junction, NJ (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 441 days.

(21) Appl. No.: 17/718,856

(22) Filed: Apr. 12, 2022

(65) Prior Publication Data

US 2022/0343068 A1 Oct. 27, 2022

Related U.S. Application Data

(60) Provisional application No. 63/174,716, filed on Apr. 14, 2021.

(51) Int. Cl.
| | |
|---|---|
| *G06F 40/30* | (2020.01) |
| *G06F 16/28* | (2019.01) |
| *G06F 40/205* | (2020.01) |
| *G06F 40/211* | (2020.01) |
| *G06F 40/284* | (2020.01) |
| *G06N 3/08* | (2023.01) |

(52) U.S. Cl.
CPC .......... *G06F 40/211* (2020.01); *G06F 16/288* (2019.01); *G06F 40/284* (2020.01); *G06F 40/30* (2020.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS

| | | | |
|---|---|---|---|
| 11,074,412 B1 * | 7/2021 | Leeman-Munk | ........ G06N 3/08 |
| 11,132,988 B1 * | 9/2021 | Steedman Henderson | .................. G10L 15/22 |
| 11,580,965 B1 * | 2/2023 | Sunkara | ................. G06N 3/045 |

(Continued)

OTHER PUBLICATIONS

Zhang, Hanlei, et al. "Discovering new intents with deep aligned clustering." In Proceedings of the AAAI Conference on Artificial Intelligence, vol. 35, No. 16, p. 14365-14373. 2021.

(Continued)

*Primary Examiner* — Lamont M Spooner
(74) *Attorney, Agent, or Firm* — Joseph Kolodka

(57) ABSTRACT

A method for detecting business intent from a business intent corpus by employing an Intent Detection via Multi-hop Unified Syntactic Graph (IDMG) is presented. The method includes parsing each text sample representing a business need description to extract syntactic information including at least tokens and words, tokenizing the words of the syntactic information to generate sub-words for each of the words by employing a multi-lingual pre-trained language model, aligning the generated sub-words to the tokens of the syntactic information to match ground-truth intent actions and objects to the tokenized sub-words, generating a unified syntactic graph, encoding, via a multi-hop unified syntactic graph encoder, the unified syntactic graph to generate an output, and predicting an intent action and object from the output.

20 Claims, 8 Drawing Sheets

(56) References Cited

U.S. PATENT DOCUMENTS

| | | | |
|---|---|---|---|
| 11,682,400 B1* | 6/2023 | Liu | G06F 40/30 |
| | | | 704/270 |
| 12,003,535 B2* | 6/2024 | Stokes, III | H04L 63/168 |
| 2021/0141798 A1* | 5/2021 | Steedman Henderson | |
| | | | G06F 16/3344 |
| 2021/0141799 A1* | 5/2021 | Steedman Henderson | |
| | | | G06N 3/045 |
| 2021/0279577 A1* | 9/2021 | West | G06N 3/045 |
| 2021/0319093 A1* | 10/2021 | Molloy | G06N 3/084 |
| 2021/0353218 A1* | 11/2021 | Edwards | A61B 5/4088 |
| 2021/0374603 A1* | 12/2021 | Xia | G06N 3/045 |
| 2021/0375273 A1* | 12/2021 | Fancellu | G06F 40/284 |
| 2021/0407679 A1* | 12/2021 | Liu | G16H 40/20 |
| 2022/0094713 A1* | 3/2022 | Lee | G06F 18/214 |
| 2022/0101113 A1* | 3/2022 | Tam | G06N 3/045 |
| 2022/0198136 A1* | 6/2022 | Peleg | G06N 3/045 |
| 2022/0215948 A1* | 7/2022 | Bardot | G16H 40/40 |
| 2022/0253447 A1* | 8/2022 | Boytsov | G06F 16/319 |
| 2022/0253871 A1* | 8/2022 | Miller | G06F 40/30 |
| 2022/0277218 A1* | 9/2022 | Fan | G06N 3/08 |
| 2022/0284884 A1* | 9/2022 | Tongya | A63F 13/67 |
| 2022/0292262 A1* | 9/2022 | Japa | G06F 16/90332 |
| 2022/0310059 A1* | 9/2022 | Jia | G10L 13/047 |
| 2023/0076576 A1* | 3/2023 | Nishida | G06F 40/284 |
| 2023/0153546 A1* | 5/2023 | Peleg | G06F 40/30 |
| | | | 704/9 |

OTHER PUBLICATIONS

Goo, Chih-Wen, et al. "Slot-gated modeling for joint slot filling and intent prediction." In Proceedings of the 2018 Conference of the North American Chapter of the Association for Computational Linguistics: Human Language Technologies, vol. 2 (Short Papers), pp. 753-757. 2018.

Vedula, Nikhita, et al. "Automatic discovery of novel intents & domains from text utlerances." arXiv preprint arXiv:2006.01208 (2020).

Vedula, Nikhita, et al. "Open intent extraction from natural language interactions." In Proceedings of the Web Conference 2020, pp. 2009-2020. 2020.

* cited by examiner

US 12,153,878 B2

INTENT DETECTION VIA MULTI-HOP UNIFIED SYNTACTIC GRAPH

RELATED APPLICATION INFORMATION

This application claims priority to Provisional Application No. 63/174,716, filed on Apr. 14, 2021, the contents of which are incorporated herein by reference in their entirety.

BACKGROUND

Technical Field

The present invention relates to intent detection and, more particularly, to intent detection via a multi-hop unified syntactic graph.

Description of the Related Art

Intent detection is a text classification task used in chat-bots and intelligent dialogue systems. Its goal is to capture semantics behind users' messages and assign it to the right label. Such a system must, given only a few examples, learn to recognize new texts that belong to the same category as the ones it was trained on. This can often be a thought task as users tend to formulate their requests in ambiguous ways. Intent detection is an important component of many Natural Language Understanding (NLU) systems. Intent detection is beneficial in chat-bots, as without intent detection, reliable dialog graphs would not be able to be built. Detecting what a user means is the primary function of any intelligent-dialog system. It allows the system to steer the conversation in the right direction, answer users' questions, and perform the actions they want to achieve.

SUMMARY

A method for detecting business intent from a business intent corpus by employing an Intent Detection via Multi-hop Unified Syntactic Graph (IDMG) is presented. The method includes parsing each text sample representing a business need description to extract syntactic information including at least tokens and words, tokenizing the words of the syntactic information to generate sub-words for each of the words by employing a multi-lingual pre-trained language model, aligning the generated sub-words to the tokens of the syntactic information to match ground-truth intent actions and objects to the tokenized sub-words, generating a unified syntactic graph, encoding, via a multi-hop unified syntactic graph encoder, the unified syntactic graph to generate an output, and predicting an intent action and object from the output.

A non-transitory computer-readable storage medium comprising a computer-readable program for detecting business intent from a business intent corpus by employing an Intent Detection via Multi-hop Unified Syntactic Graph (IDMG) is presented. The computer-readable program when executed on a computer causes the computer to perform the steps of parsing each text sample representing a business need description to extract syntactic information including at least tokens and words, tokenizing the words of the syntactic information to generate sub-words for each of the words by employing a multi-lingual pre-trained language model, aligning the generated sub-words to the tokens of the syntactic information to match ground-truth intent actions and objects to the tokenized sub-words, generating a unified syntactic graph, encoding, via a multi-hop unified syntactic graph encoder, the unified syntactic graph to generate an output, and predicting an intent action and object from the output.

A system for detecting business intent from a business intent corpus by employing an Intent Detection via Multi-hop Unified Syntactic Graph (IDMG) is presented. The system includes a memory and one or more processors in communication with the memory configured to parse each text sample representing a business need description to extract syntactic information including at least tokens and words, tokenize the words of the syntactic information to generate sub-words for each of the words by employing a multi-lingual pre-trained language model, align the generated sub-words to the tokens of the syntactic information to match ground-truth intent actions and objects to the tokenized sub-words, generating a unified syntactic graph, encode, via a multi-hop unified syntactic graph encoder, the unified syntactic graph to generate an output, and predict an intent action and object from the output.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Intent recognition, sometimes called intent classification, is the task of taking a written or spoken input, and classifying it based on what the user wants to achieve. Intent recognition forms an essential component of chatbots and finds use in sales conversions, customer support, and many other areas. Intent recognition is a form of natural language processing (NLP), a subfield of artificial intelligence. NLP is concerned with computers processing and analyzing natural language, i.e., any language that has developed naturally, rather than artificially, such as with computer coding languages.

The exemplary embodiments of the present invention present a business need corpus, in which each text sample is or represents a description of business need.

The goal is to detect the intent of the business need with intent action and object.

The exemplary embodiments of the present invention propose an Intent Detection method via Multi-hop Unified Syntactic Graph (IDMG) to address the business need intent detection problem. The exemplary embodiments of the present invention include the following:

Syntactic parsing, where the business need description is parsed to extract the syntactic information including, e.g., part-of-speech, dependency relation and abstract meaning relation.

Pre-training model tokenization, where the word extracted from dependency parsing is tokenized and sub-words for each word are generated by a multi-lingual pre-trained language model.

Token sub-word alignment where the generated sub-words are aligned to match the ground-truth answer span to the sub-word.

Business need graph generation, where based on the token and dependency relation generated, the graph of the business need for each sentence is generated.

Graph encoding, where the generated business need graph is encoded for the need description.

Intent prediction, where the output of the graph encoding is used for predicting the intent action and object.

The inventive features of the business intent detection model include at least the following:

A novel business need graph representation for intent detection so that the syntactic information can be utilized for extracting the business intent.

A novel multi-hop graph encoding method is proposed to model the semantic and syntactic relation between words in the unified syntactic graph cumulated over multiple hops.

Figure 1:
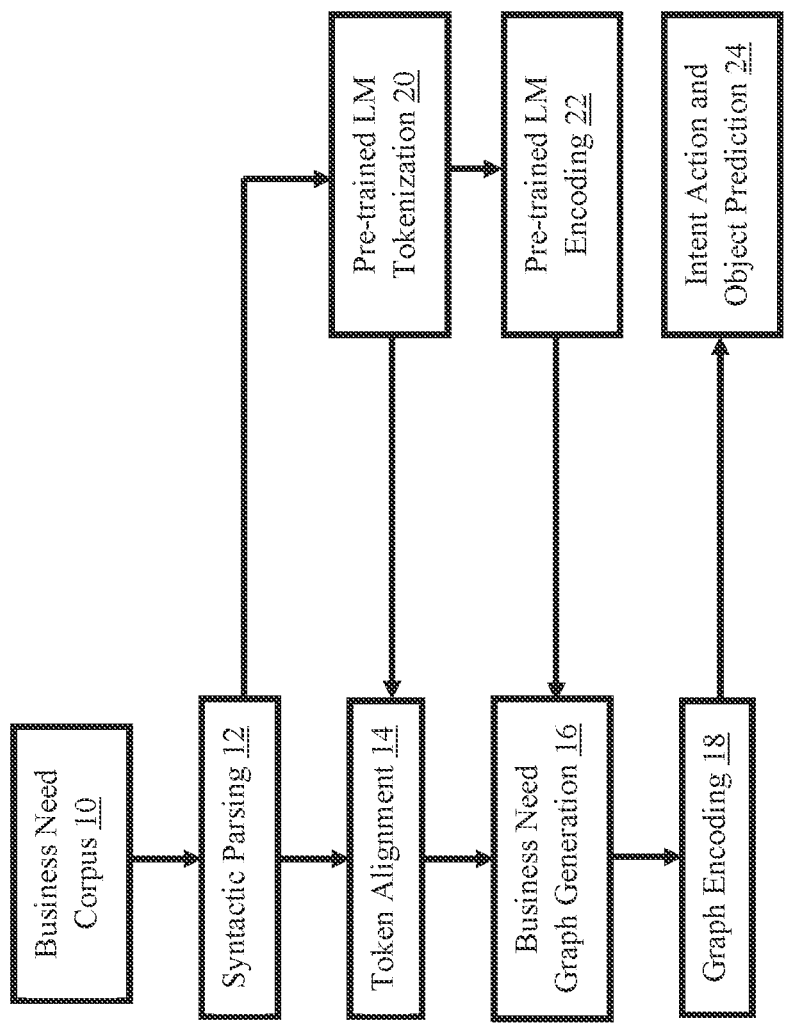
FIG. 1 is a block/flow diagram of an exemplary procedure for Intent Detection via Multi-hop Unified Syntactic Graph (IDMG), in accordance with embodiments of the present invention.

FIG. 1 is a block/flow diagram of an exemplary procedure for Intent Detection via Multi-hop Unified Syntactic Graph (IDMG), in accordance with embodiments of the present invention.

The IDMG process 5 includes the business need corpus 10, a parser 12 for enabling syntactic parsing, a token aligner 14 for enabling token alignment, a business need graph generator 16, and a graph encoder 18. A pre-trained language model (LM) tokenizer 20 and a pre-trained language model (LM) encoder 22 are further employed. The output 24 is the intent action and object prediction. The IDMG process 5 will be described in detail further below.

Figure 2:
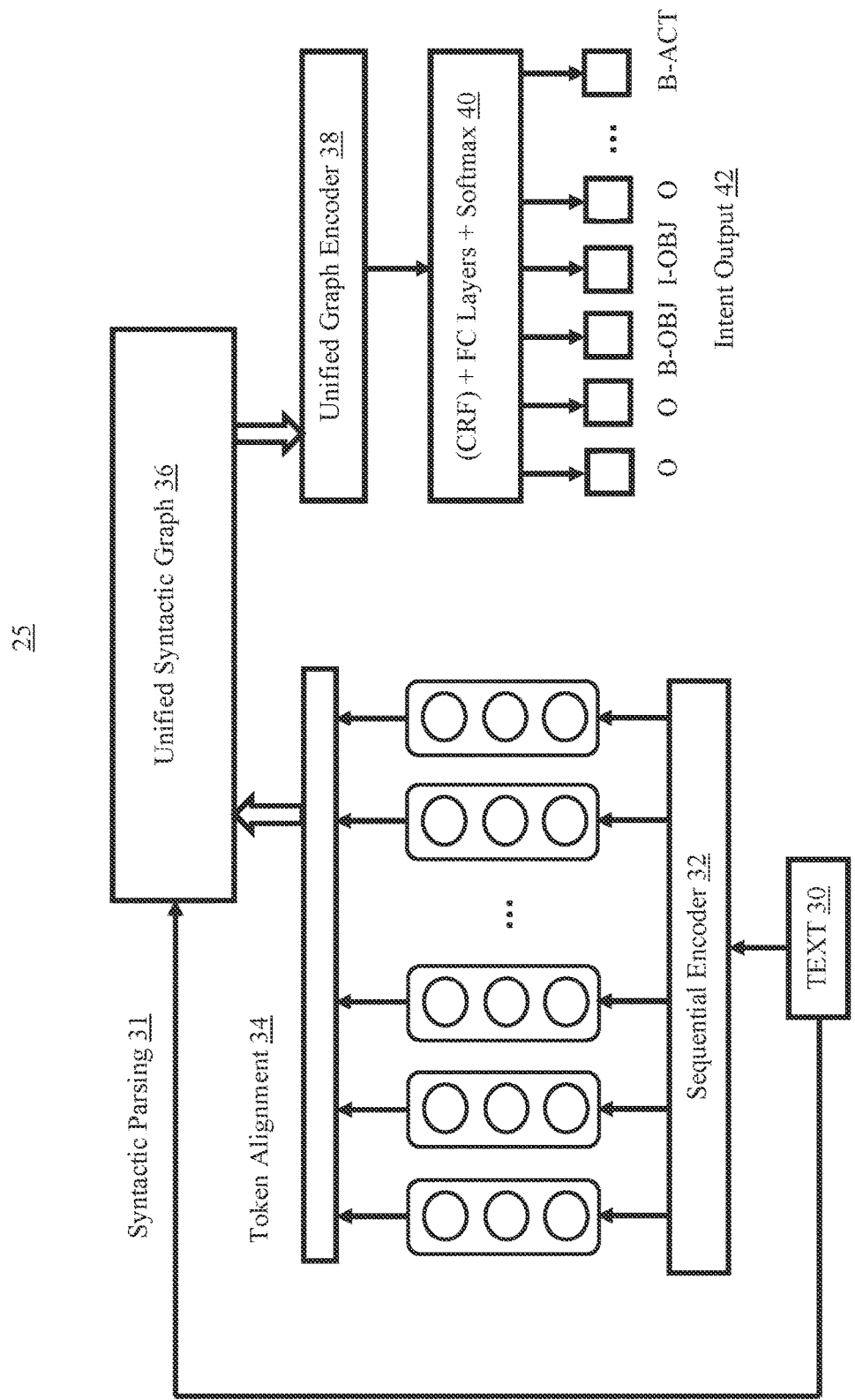
FIG. 2 is a block/flow diagram of an exemplary architecture graph of the IDMG, in accordance with embodiments of the present invention.

FIG. 2 is a block/flow diagram of an exemplary architecture graph of the IDMG 25, in accordance with embodiments of the present invention.

Text corpus data 30 is fed into the sequential encoder 32 to enable syntactic parsing 31 and token alignment 34. The data is then fed into the unified syntactic graph 36 and then provided to the unified syntactic encoder 38. Further processing 40 takes place to obtain the intent output 42, the intent output 42 including intent object (B-OBJ, I-OBJ) and action (B-ACT). The IDMG architecture 25 will be described in detail further below.

Regarding the business need corpus data, text corpus data include a set of business needs. For each business need, its corresponding description in multiple sentences is usually provided.

Regarding syntactic parsing, the syntactic information is parsed from the business need data. Specifically, the following information can be extracted:
  List of tokens and words for both contexts and questions.
  Part-of-Speech (POS) for each word.
  The relation between the words in the sentences.

Regarding pre-training model tokenization, the words extracted are tokenized and the sub-words for each word are generated by a pre-trained language model such as BERT for English language. If the business need is written in other languages such as French or Japanese, a multi-lingual pre-trained language model is used, such as mBERT and XLMR. In particular, the tokenizer of the pre-trained model is used to generate the sub-words.

Bidirectional Encoder Representations from Transformers (BERT) is a transformer-based machine learning technique for natural language processing (NLP) pre-training developed by Google. BERT was created and published in 2018. In 2019, Google announced that it had begun leveraging BERT in its search engine, and by late 2020 Google was using BERT in almost every English-language query.

mBERT stands for multilingual BERT and is the next step in creating models that understand the meaning of words in the context. MBERT is a deep learning model that was trained on 104 languages simultaneously and encodes the knowledge of all 104 languages together.

XLMR stands for XLM-Roberta. The Facebook AI team released XLM-RoBERTa in November 2019 as an update to their original XLM-100 model. Both are transformer-based language models, both rely on the Masked Language Model objective, and both are capable of processing text from 100 separate languages. The biggest update that XLM-Roberta offers over the original is a significantly increased amount of training data. The "RoBERTa" part comes from the fact that its training routine is the same as the monolingual RoBERTa model, specifically, that the sole training objective is the Masked Language Model.

Regarding token alignment, the generated sub-word is aligned to the token generated by the syntactic parser. The purpose of the token and sub-word alignment is to match the ground-truth intent actions and objects to the tokenized sub-words by the pre-trained language model.

Regarding pre-training model encoding, the words in the sentence are encoded using the pre-training language model and the low-dimensional representation is extracted for the graph encoding step.

Regarding unified syntactic graph generation, based on the token and dependency relation generated, the unified syntactic graph is generated in the following steps:
Node construction.
Node Relation Construction.
  Inter-Sentence Relation Construction.

Regarding multi-hop unified syntactic graph encoding, the generated unified syntactic graph is encoded for the intent detection. The overall architecture of the multi-hop unified syntactic graph encoder is shown in FIG. 3.

Figure 3:
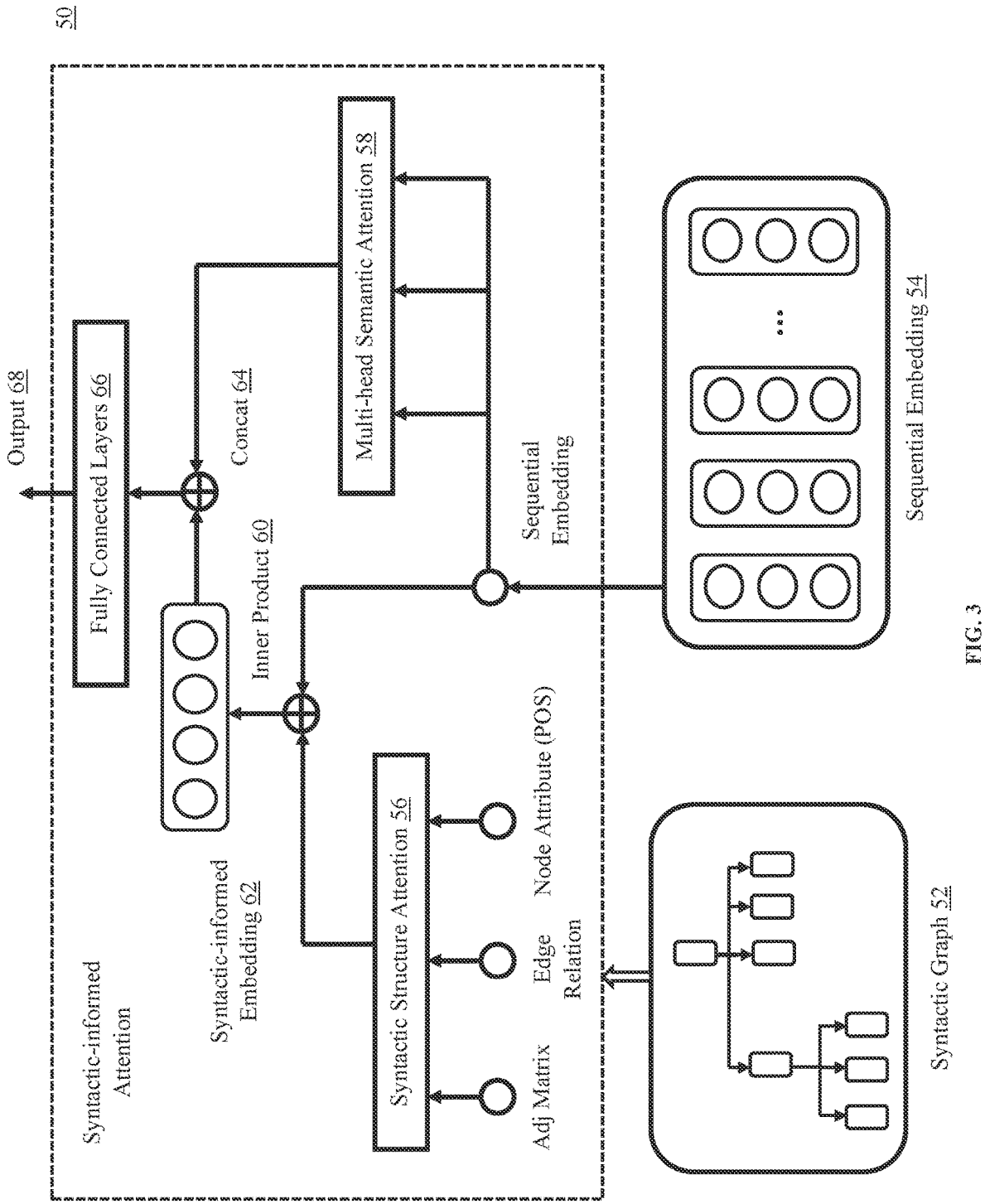
FIG. 3 is a block/flow diagram of an exemplary multi-hop unified syntactic graph encoder, in accordance with embodiments of the present invention.

FIG. 3 is a block/flow diagram of an exemplary multi-hop unified syntactic graph encoder 50, in accordance with embodiments of the present invention.

The syntactic graph 52 feeds adj matrix data, edge relation data, and note attribute (POS) data to the syntactic structure attention component 56. Sequential embeddings 54 are fed into the multi-head semantic attention component 58. The data from the syntactic structure attention component 56 (e.g., syntactic-informed embeddings 62) and the multi-head semantic attention component 58 are concatenated to form inner product 60. The output 64 is fed into the fully connected layers 66 to generate output 68.

First, the relation between node i and node j is represented as follows:

$$m^{i \to j} = \theta^T [W_p p_i \| W_p p_j \| W_r r_{ij}]$$

where $p_i$ and $p_j$ are the node attribute embeddings for the i-th and j-th token and $r_{ij}$ is the embedding of the edge relation. The node embeddings of $p_i$ and $p_j$ are the concatenation of pre-trained language model embedding and its part-of-speech embedding.

If node i and j are directly connected, the edge embedding $r_{ij}$ is initialized as the type of dependency relation and fine-tuned during the training process. If node i and j are not directly connected, the edge embedding $r_{ij}$ is the sum of all the edge segments.

Figure 4:
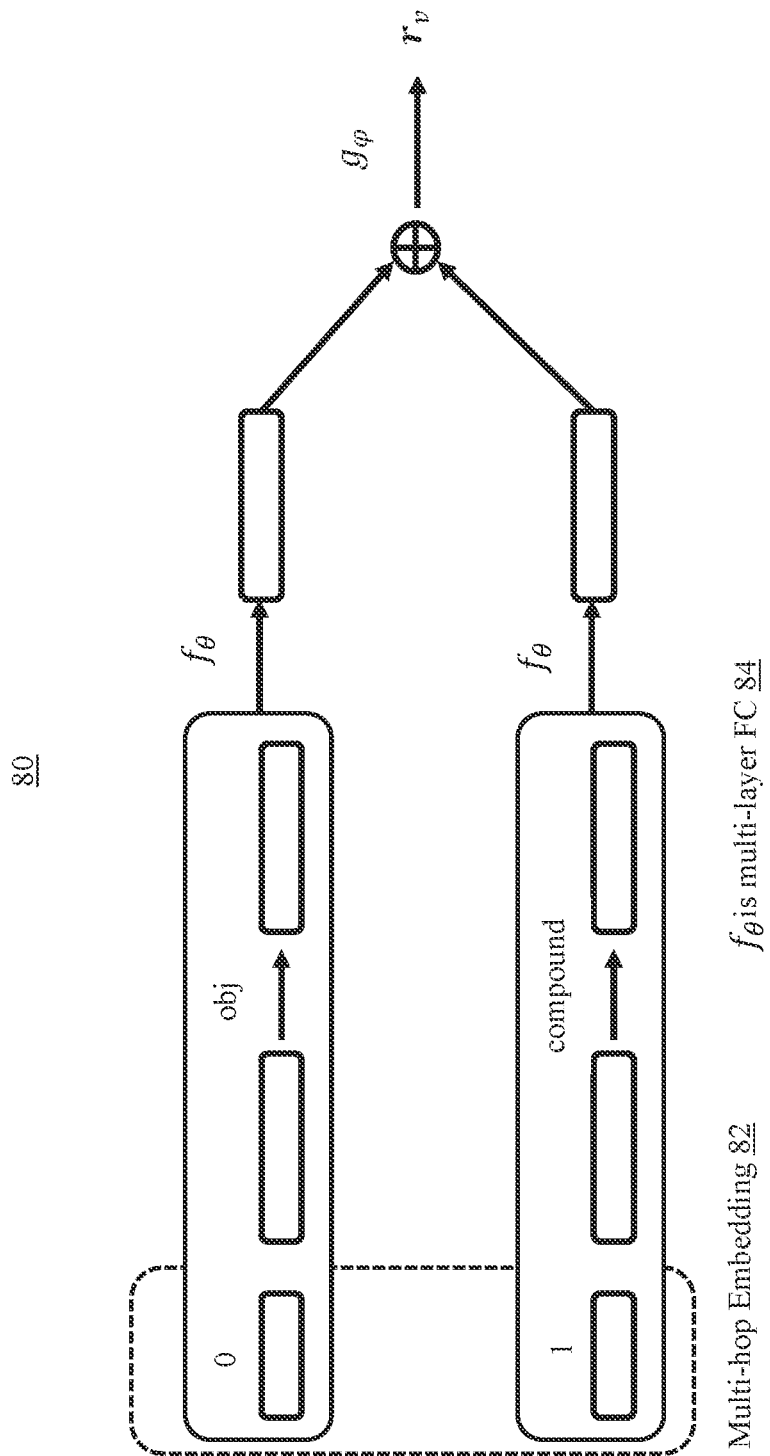
FIG. 4 is a block/flow diagram illustrating two nodes connected by one intermediate node for multi-hop embedding, in accordance with embodiments of the present invention.

FIG. 4 shows an example 80 of two nodes that are connected by one intermediate node.

The multi-hop embedding 82 can be represented as follows:

$$h(k, j) = \begin{cases} \sin(k/10000^{j/d}) & \text{if } j = 2i-1, i \in \mathbb{Z}^+ \\ \cos(k/10000^{j/d}) & \text{if } j = 2i, i \in \mathbb{Z}^+, \end{cases}$$

where k is the multi-hop number, j is the index of dimension and d is the dimension size of time encoding.

Then the representation of node i based on its multi-hop path relations 84 can be defined as follows:

$$V^{(t+1)} = \text{softmax}_g\left(\frac{[m^{i \to j}]_{j \in \mathcal{N}^*(i)}}{\sqrt{2d_p + d_r}}\right) V^{(t)}$$

where $\mathcal{N}^*(i)$ represents the neighbors of node i in multi-hop-enriched graph $\mathcal{G}$. $V^{(t)} \in \mathbb{R}^{l \times d}$ is the node representations in the t-th layer.

After that, $z_1$ and node embedding $n_1$ are concatenated as the input of the intent detection layer.

Regarding the intent detection prediction, the output to fully connected layers is used separately for predicting the sequential labels of the intent in the following three categories: None, ACT and OBJ. Here, "ACT" represents the intent action and "OBJ" is the intent object. If a token doesn't belong to neither intent action or object, they are categorized as the label "None."

Figure 5:
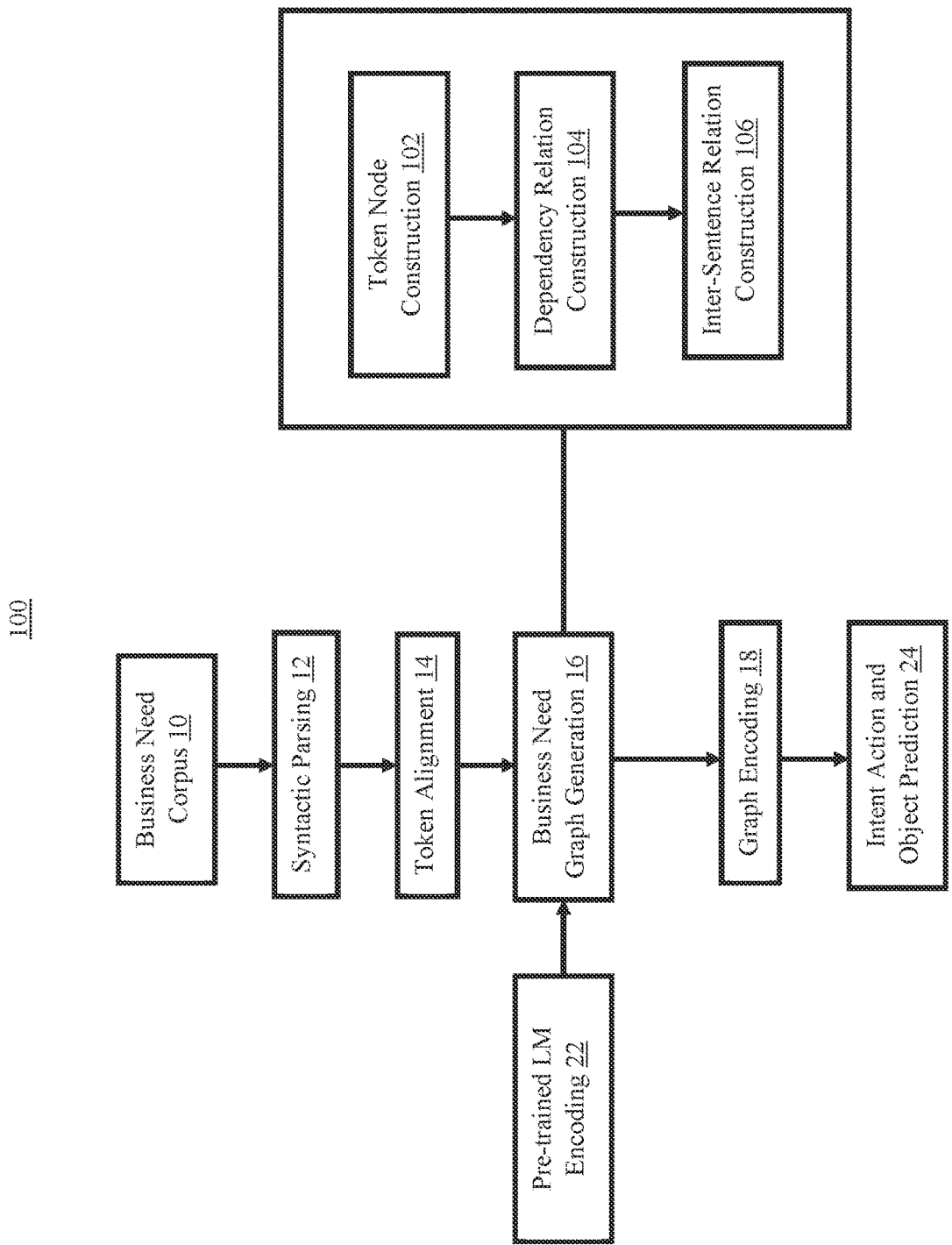
FIG. 5 is a block/flow diagram illustrating the procedure of unified syntactic graph generation, in accordance with embodiments of the present invention.

FIG. 5 is a block/flow diagram illustrating the procedure of unified syntactic graph generation 100, in accordance with embodiments of the present invention.

Regarding token node construction 102, the exemplary methods construct the node in the unified syntact graph by using the generated sub-words. Specifically, the initial node embedding is concatenated by the pre-trained language model and POS tagging.

Regarding dependency relation construction 104, the exemplary methods connect the nodes together with the following two relations:

Nodes (sub-words) with the dependency relations. The type of edge is used as the relation generated by the dependency parser.

Sub-words belong to the same word generated by the dependency parser. The exemplary methods create a new type of relation such as a sub-word relation to connect all these types of sub-words.

Regarding inter-sentence relation construction 106, the exemplary methods connect the root nodes of each sentence together and assign a new type of relation referred to as "inter-sentence" relation.

In conclusion, the IDMG 25 enables faster and more accurate responses to user queries. Thus, chatbot communications or conversational robot communications can be significantly improved as chatbots can provide more accurate responses to user queries, as IDMG results in less computations and processing.

Figure 6:
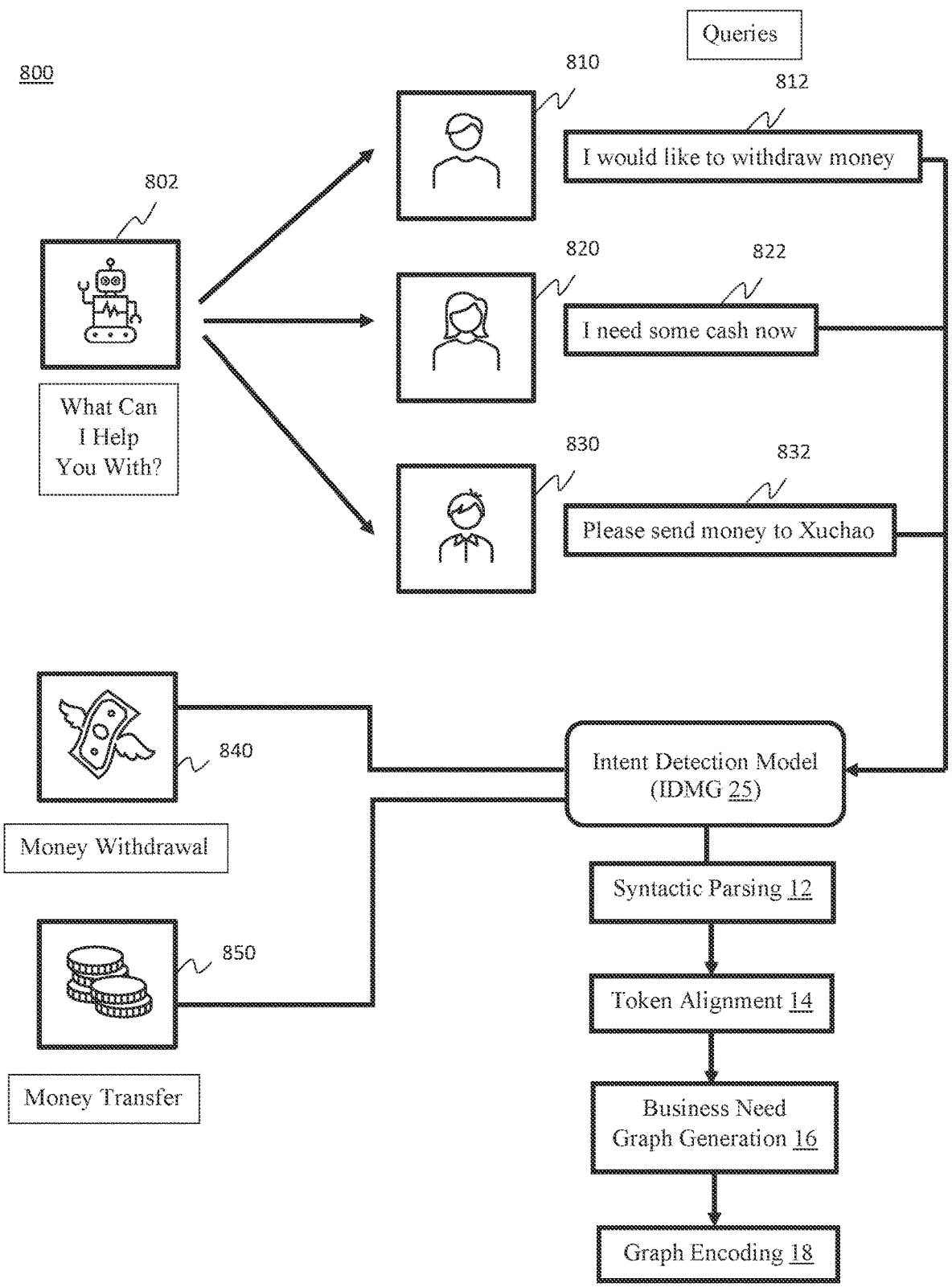
FIG. 6 is an exemplary practical application for detecting business intent from a business intent corpus by employing the Intent Detection via Multi-hop Unified Syntactic Graph (IDMG), in accordance with embodiments of the present invention.

FIG. 6 is a block/flow diagram 800 of a practical application for detecting business intent from a business intent corpus by employing the Intent Detection via Multi-hop Unified Syntactic Graph (IDMG), in accordance with embodiments of the present invention.

In one practical example, a chatbot 802 asks the question, "What can I do for you?" A first person 810 has a query 812. Query 812 is "I would like to withdraw money." A second person 820 has a query 822. Query 822 is "I need some cash now." A third person 830 has a query 832. Query 832 is "Please send money to Xuchao." The queries 812, 822, 832 are fed into the Intent Detection Model (IDMG 25). The IDMG 25 processes the queries or requests by applying the syntactic parsing 12, the token alignment 14, the business need generation graph 16, and the graph encoding 18 described above. The IDMG 25 generates outputs 840, 850, which are predictions. Output 840 initiates a money withdrawal and output 850 initiates a money transfer based on the queries 812, 822, 832 of the users 810, 820, 830, respectively.

Therefore, the exemplary embodiments can be applied to many different types of practical applications. Intent classification is also known as intent recognition and is a branch of NLP that focuses on categorizing text into various groups in order to make it easier to understand. In essence, intent classification is the act of correctly detecting natural language speech from a set of pre-defined intentions.

Customer service is valued highly by many businesses. The interaction between an organization's representative and a client may be automated to provide better service (as in the practical application of FIG. 6). The majority of clients have a specific request or question in mind when they contact the company. To service them, the customer's objective must be classified.

The purpose of intent recognition or categorization is to determine why a customer contacted the firm and what the customer intends to achieve. A conversation system that uses intent categorization to automate the interaction can do so partially or totally.

Human representations may benefit from intent classification as well, for example, by directing incoming messages to the representative with the necessary expertise.

NLP is used by chatbots 802 to understand the user's intent or reason for starting the conversation. Machine learning classification algorithms classify it and respond properly depending on the training data. It's an important feature that determines whether chatbot 802 will be effective in satisfying a user's sales, marketing, or customer service objectives. The IDMG 25 of the exemplary embodiments can help accomplish customer service objectives.

Figure 7:
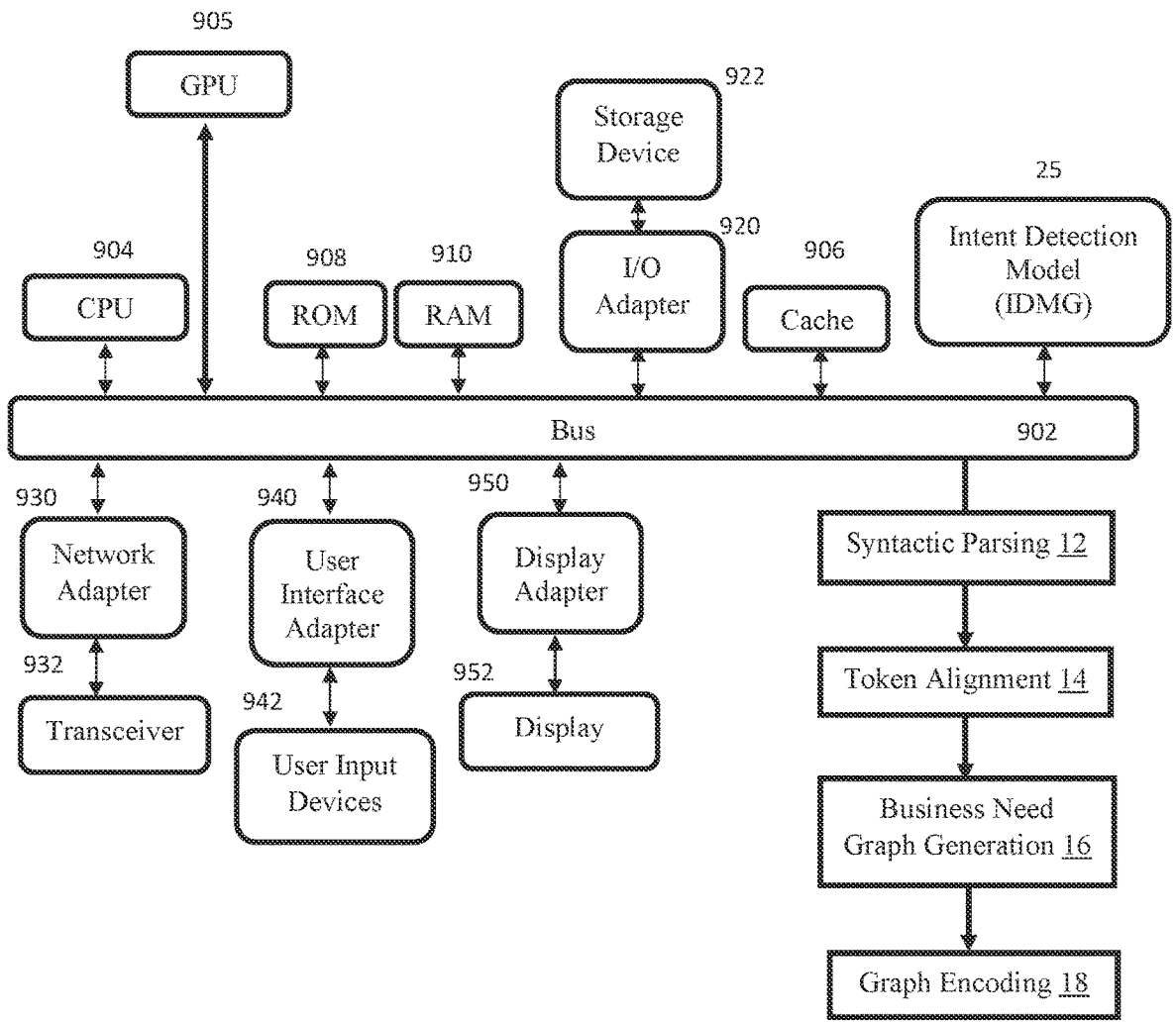
FIG. 7 is an exemplary processing system for detecting business intent from a business intent corpus by employing the Intent Detection via Multi-hop Unified Syntactic Graph (IDMG), in accordance with embodiments of the present invention.

FIG. 7 is an exemplary processing system for detecting business intent from a business intent corpus by employing the Intent Detection via Multi-hop Unified Syntactic Graph (IDMG), in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the IDMG 25 processes queries or requests by applying the syntactic parsing 12, the token alignment 14, the business need generation graph 16, and the graph encoding 18 described above.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
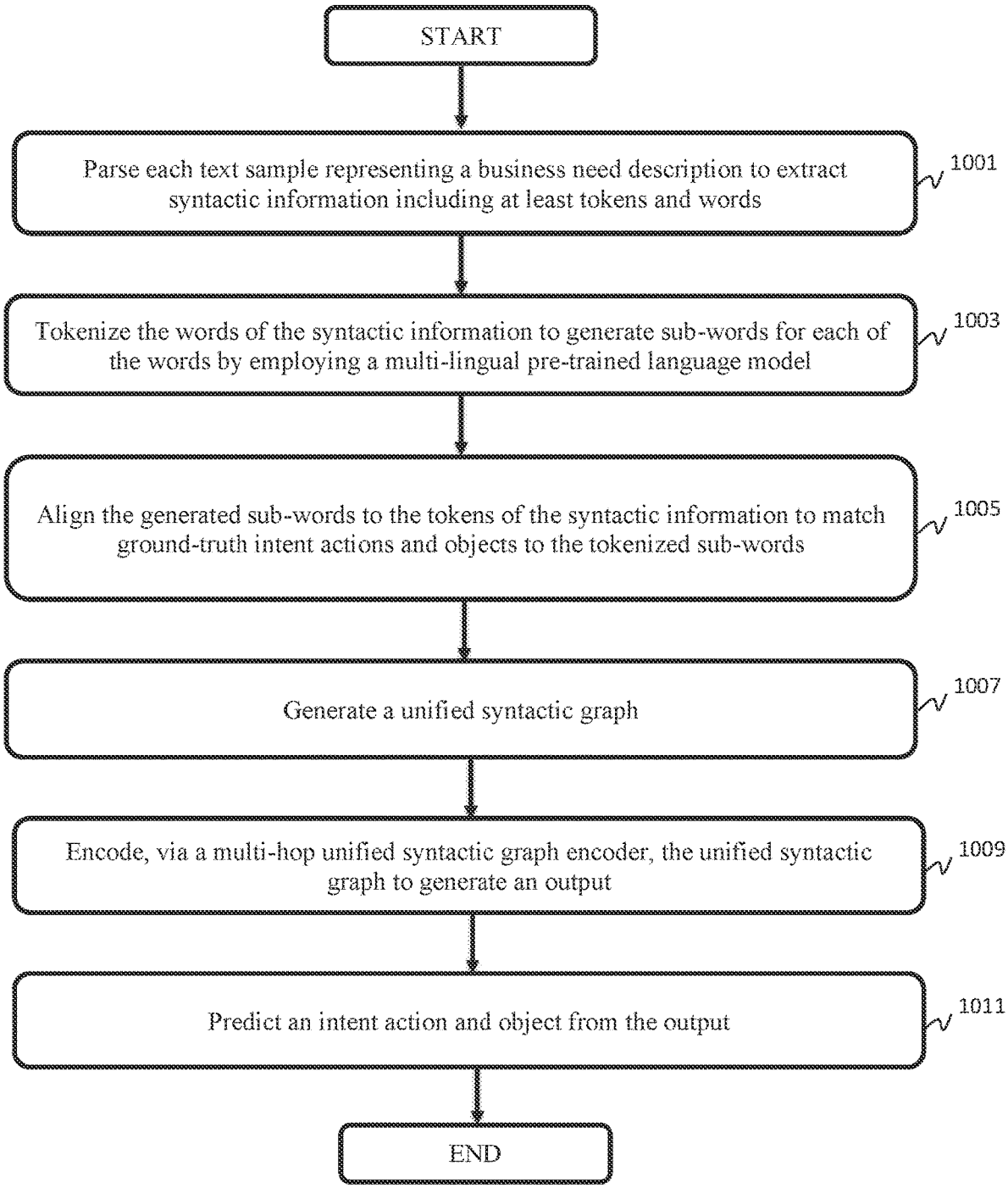
FIG. 8 is a block/flow diagram of an exemplary method for detecting business intent from a business intent corpus by employing the Intent Detection via Multi-hop Unified Syntactic Graph (IDMG), in accordance with embodiments of the present invention.

FIG. 8 is a block/flow diagram of an exemplary method for detecting business intent from a business intent corpus by employing the Intent Detection via Multi-hop Unified Syntactic Graph (IDMG), in accordance with embodiments of the present invention.

At block 1001, parse each text sample representing a business need description to extract syntactic information including at least tokens and words.

At block 1003, tokenize the words of the syntactic information to generate sub-words for each of the words by employing a multi-lingual pre-trained language model.

At block 1005, align the generated sub-words to the tokens of the syntactic information to match ground-truth intent actions and objects to the tokenized sub-words.

At block 1007, generate a unified syntactic graph.

At block 1009, encode, via a multi-hop unified syntactic graph encoder, the unified syntactic graph to generate an output.

At block 1011, predict an intent action and object from the output.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting business intent from a business intent corpus by employing an Intent Detection via Multi-hop Unified Syntactic Graph (IDMG), the method comprising:
    parsing each text sample representing a business need description to extract syntactic information including at least tokens and words;
    tokenizing the words of the syntactic information to generate sub-words for each of the words by employing a multi-lingual pre-trained language model;
    aligning the generated sub-words to the tokens of the syntactic information to match ground-truth intent actions and objects to the tokenized sub-words;
    generating a unified syntactic graph;
    encoding, via a multi-hop unified syntactic graph encoder, the unified syntactic graph to generate an output; and
    predicting an intent action and object from the output.

2. The method of claim 1, wherein the syntactic information further includes at least part-of-speech for each of the words, dependency relation, and abstract meaning relation.

3. The method of claim 1, wherein generation of the unified syntactic graph includes token node construction, node relation construction, and inter-sentence relation construction.

4. The method of claim 1, wherein the multi-hop unified syntactic graph encoder includes a syntactic structure attention component and a multi-head semantic attention component.

5. The method of claim 4, wherein the syntactic structure attention component receives edge relations and node attributes as input from the unified syntactic graph and the multi-head semantic attention component receives sequential embeddings as input.

6. The method of claim 5, wherein, if a first node and a second node are directly connected, an edge embedding is initialized as a type of dependency relation and fine-tuned during a training process.

7. The method of claim 5, wherein if a first node and a second node are not directly connected, an edge embedding is a sum of all edge segments.

8. A non-transitory computer-readable storage medium comprising a computer-readable program for detecting business intent from a business intent corpus by employing an Intent Detection via Multi-hop Unified Syntactic Graph (IDMG), wherein the computer-readable program when executed on a computer causes the computer to perform the steps of:

parsing each text sample representing a business need description to extract syntactic information including at least tokens and words;

tokenizing the words of the syntactic information to generate sub-words for each of the words by employing a multi-lingual pre-trained language model;

aligning the generated sub-words to the tokens of the syntactic information to match ground-truth intent actions and objects to the tokenized sub-words;

generating a unified syntactic graph;

encoding, via a multi-hop unified syntactic graph encoder, the unified syntactic graph to generate an output; and predicting an intent action and object from the output.

9. The non-transitory computer-readable storage medium of claim 8, wherein the syntactic information further includes at least part-of-speech for each of the words, dependency relation, and abstract meaning relation.

10. The non-transitory computer-readable storage medium of claim 8, wherein generation of the unified syntactic graph includes token node construction, node relation construction, and inter-sentence relation construction.

11. The non-transitory computer-readable storage medium of claim 8, wherein the multi-hop unified syntactic graph encoder includes a syntactic structure attention component and a multi-head semantic attention component.

12. The non-transitory computer-readable storage medium of claim 11, wherein the syntactic structure attention component receives edge relations and node attributes as input from the unified syntactic graph and the multi-head semantic attention component receives sequential embeddings as input.

13. The non-transitory computer-readable storage medium of claim 12, wherein, if a first node and a second node are directly connected, an edge embedding is initialized as a type of dependency relation and fine-tuned during a training process.

14. The non-transitory computer-readable storage medium of claim 12, wherein if a first node and a second node are not directly connected, an edge embedding is a sum of all edge segments.

15. A system for detecting business intent from a business intent corpus by employing an Intent Detection via Multi-hop Unified Syntactic Graph (IDMG), the system comprising:

a memory; and one or more processors in communication with the memory configured to:

parse each text sample representing a business need description to extract syntactic information including at least tokens and words;

tokenize the words of the syntactic information to generate sub-words for each of the words by employing a multi-lingual pre-trained language model;

align the generated sub-words to the tokens of the syntactic information to match ground-truth intent actions and objects to the tokenized sub-words;

generate a unified syntactic graph;

encode, via a multi-hop unified syntactic graph encoder, the unified syntactic graph to generate an output; and predict an intent action and object from the output.

16. The system of claim 15, wherein the syntactic information further includes at least part-of-speech for each of the words, dependency relation, and abstract meaning relation.

17. The system of claim 15, wherein generation of the unified syntactic graph includes token node construction, node relation construction, and inter-sentence relation construction.

18. The system of claim 15, wherein the multi-hop unified syntactic graph encoder includes a syntactic structure attention component and a multi-head semantic attention component.

19. The system of claim 18, wherein the syntactic structure attention component receives edge relations and node attributes as input from the unified syntactic graph and the multi-head semantic attention component receives sequential embeddings as input.

20. The system of claim 19, wherein, if a first node and a second node are directly connected, an edge embedding is initialized as a type of dependency relation and fine-tuned during a training process; and wherein if the first node and the second node are not directly connected, the edge embedding is a sum of all edge segments.

* * * * *